(12) United States Patent
Rose et al.

(10) Patent No.: US 6,355,171 B1
(45) Date of Patent: Mar. 12, 2002

(54) FILTER SOCK FOR LIQUID FILTRATION APPARATUS

(75) Inventors: Stephen W. Rose, Eagle; Steven L. Hughes, New Berlin, both of WI (US)

(73) Assignee: Oberlin Filter Company, Waukesha, WI (US)

( * ) Notice: Subject to any disclaimer, the term of this patent is extended or adjusted under 35 U.S.C. 154(b) by 0 days.

(21) Appl. No.: 09/436,587

(22) Filed: Nov. 9, 1999

(51) Int. Cl.[7] .............................................. B01D 29/11
(52) U.S. Cl. .................... 210/323.2; 210/346; 210/483; 210/486; 210/487; 210/497.01
(58) Field of Search .............................. 210/323.2, 346, 210/483, 486, 489, 494.1, 497.01, 497.2, 503, 505; 55/361, 527, 529

(56) References Cited

U.S. PATENT DOCUMENTS

| | | |
|---|---|---|
| 3,169,899 A | 2/1965 | Steuber |
| 3,403,862 A | 10/1968 | Dworjanyn |
| 3,485,706 A | 12/1969 | Evans |
| 3,532,589 A | 10/1970 | David |
| 3,807,147 A * | 4/1974 | Schoonen et al. ............ 55/368 |
| 3,830,037 A | 8/1974 | Osborn et al. |
| 3,939,875 A | 2/1976 | Osborn et al. |
| 3,945,873 A | 3/1976 | Osborn |
| 4,058,456 A * | 11/1977 | Head ............................ 55/524 |
| 4,086,774 A | 5/1978 | Duggins |
| 4,152,389 A | 5/1979 | Miller |
| 4,536,439 A | 8/1985 | Forsten |
| 4,861,353 A | 8/1989 | Wyss |
| 5,023,130 A | 6/1991 | Simpson et al. |
| 5,171,339 A | 12/1992 | Forsten |
| 5,290,628 A | 3/1994 | Lim et al. |
| 5,354,466 A | 10/1994 | Yunoki |
| 5,429,864 A | 7/1995 | Samuels |
| 5,456,834 A | 10/1995 | Bowlsbey |
| 5,580,456 A | 12/1996 | Bowlsbey |
| 5,607,735 A * | 3/1997 | Brown ......................... 55/528 |
| 5,639,369 A | 6/1997 | Bowlsbey |
| 5,780,153 A | 7/1998 | Chou et al. |
| 5,817,415 A | 10/1998 | Chou et al. |
| 5,882,519 A | 3/1999 | Chou et al. |

FOREIGN PATENT DOCUMENTS

WO    WO98/07905    2/1998

OTHER PUBLICATIONS

"Filteration Media of TYVEK(R) Help You Meet Tough EPA Requirements for Submicron Separations," DuPont, Aug. 1995.
"DuPont TYVEK(R)—The Medium That Fits a Wide Variety of Filtration Needs," DuPont, Apr. 1998.
"Tyvek(R) Property Comparison of Two Current Filtration Styles and a New Style," DuPont, Sep. 1997.
"E.I. DuPont De Nemours and Company, and Oberlin Filter Company (membrane Microfiltration)," promotional information believed available on the Internet well prior to 1998.

* cited by examiner

Primary Examiner—John Kim
(74) Attorney, Agent, or Firm—Jansson, Shupe & Munger, Ltd.

(57) ABSTRACT

Improved liquid filter apparatus of the filter-sock type is disclosed. The filter sock is a non-perforated non-woven filter material of flash-spun plexifilamentary polyolefin (preferably polyethylene) fibrils, wherein the filter material has a pressure drop of less than 4 psid at a flow rate of 10 gal/hr and a filtration efficiency of at least 98% of 1–2 micron particulates at a pressure differential of 30 psid. In certain preferred embodiments, the filter material, which is most preferably a sole sock layer, has: a pressure drop less than 1.5 psid at a flow rate of 10 gal/hr and filtration efficiency is at least 99% of 1–2 micron particulates at a pressure differential of 30 psid; a mean flow pore size greater than 4 microns while its nominal pore-size filtration rating is 1 micron; a Gurley Hill porosity rating no more than 5 sec/100 cc; a thickness of less than 0.15 mm; and/or a basis weight of less than 45 g/m$^2$.

17 Claims, 3 Drawing Sheets

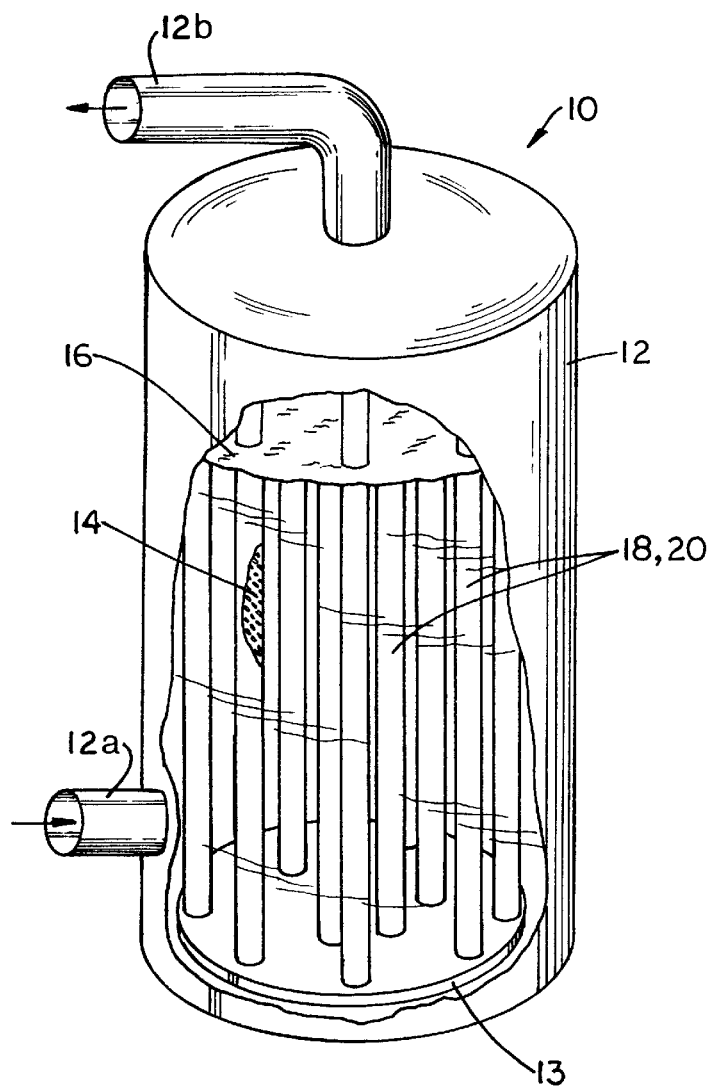
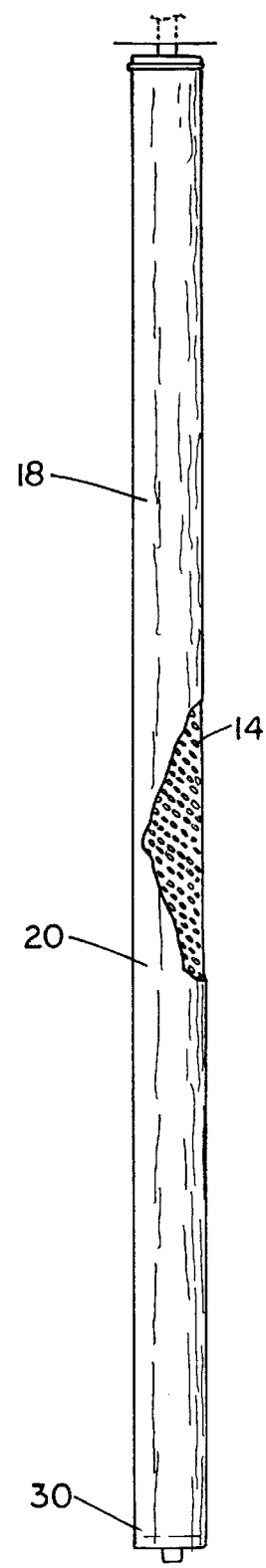
FIG. 1
FIG. 2

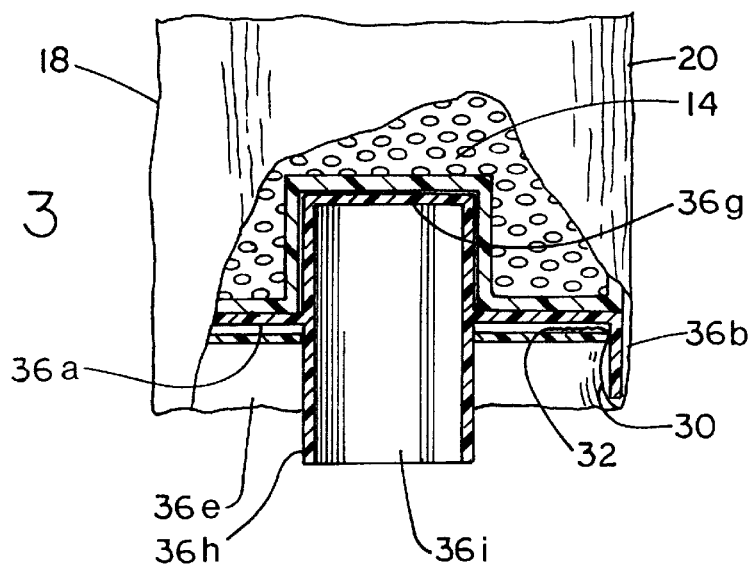
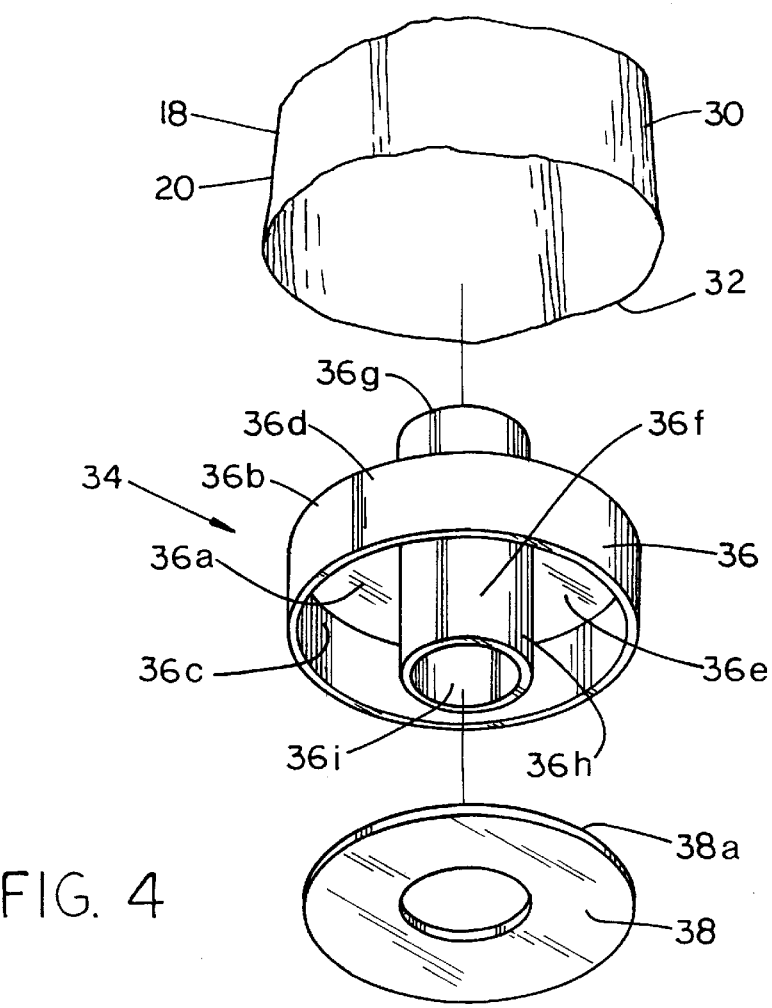

FILTER SOCK FOR LIQUID FILTRATION APPARATUS

FIELD OF THE INVENTION

This invention is related generally to liquid filtration apparatus of the type having filter socks and, more particularly, to filter socks for such apparatus.

BACKGROUND OF THE INVENTION

Tubular filters, sometimes referred to as filter socks or sleeves, are used in various liquid filtration applications involving the removal of particulates from a liquid stream. Such liquid filtration apparatus typically include a liquid vessel, a multiplicity of elongate sock supports which are suspended within the vessel, and a filter sock over and along each of the sock supports.

In such typical liquid filtration apparatus, each elongate sock support is a rigid tube structure with a hollow interior and an open end for fluid communication with a downstream flow channel leaving the vessel. Each such tube structure has a large number of closely-spaced perforations at all locations along its length to allow ingress of filtrate liquid all along the length of the tube structure—after the filtrate has passed through the filter sock which is mounted on such sock support. The elongate sock supports are typically suspended from above, with at least a majority of their lengths, or more accurately at least the majority of the lengths of the filter socks thereon, being submerged in the unfiltered liquid which is contained in the liquid vessel.

Liquid flows through the filter socks, through the sock-mount perforations and into the sock-mount tube structures, up the sock-mount tube structures, and through the open ends thereof into one or more downstream flow channels (typically overhead) which receive the filtrate (i.e., filtered liquid). This flow of liquid—through the filter socks (and related structure)—is caused when a sufficient pressure differential is established between the liquid vessel (i.e., outside the filter socks) and downstream of the filter socks.

Certain materials have been used as liquid filter socks, including woven materials, microporous membranes, membranes such as dirt-treated polypropylene, and certain laminates such as expanded polytetravfluoroethylene (PTFE) bonded to a felt or felt-like material. However, available liquid filter socks have significant drawbacks, disadvantages and problems related to the nature of their materials, particularly when used in certain applications, and liquid filter socks have particular problems and concerns.

Liquid filter socks of certain materials, such as the laminates referred to above, are prone to delamination of the PTFE layer from the felt or felt-like layer, particularly in repetitive use and depending on various conditions to which the laminate is exposed, such as the pressure differentials, the liquids and the high temperatures which may be involved, the nature of upset conditions from back-pulsing (to remove accumulated solids) and the like. Furthermore, the PTFE layer, which provides the primary filtering action, requires a felt or felt-like lamination with it because the PTFE layer alone does not have sufficient strength on its own to function as a filter sock, i.e., in a filter-sock environment.

Liquid filter socks of some materials present problems in that they are incapable of providing efficient filtering action; they allow passage of liquid at an insufficient pace or else fail to remove significant amounts of undesired particulates. Filter socks of some materials are weak and incapable of extended operation at significant pressure differentials. If they are thin, which may be desirable for reasons such as improved flow-through, they are prone to be unable to withstand desired pressure differentials without losses in integrity. Some liquid filter socks have problems in releasing particulate materials during back-pulsing (back-washing).

One significant problem with commercially-available liquid filter socks is the simple fact that they are quite costly and in many cases require replacement on a fairly frequent basis.

Other problems recognized in the art involve the nature of the distal end of the liquid filter sock. Filter socks are often cylindrical sleeves which are open at both ends and have end portions which engage imperforate annular wall portions near each of the ends of the sock support, by means of a wide elastic band, a cord, water-proof tape, a removable ring-clamp or the like. Such sealing operations at both ends may be prone to problems of inaccuracy of installation and failures, particularly for relatively thick sock materials; if liquid-tight seals are not made, particulates can seep past the filter and into the filtrate inside the sock supports. In fact, exposure of the edge of the filter sock, including any inner drainage layer, can offer a pathway for unintended seepage of particulates into the filtrate. With thick sock materials, such as the aforementioned PTFE-felt laminates, leakage proneness is exacerbated because of a tendency for the sock material to bunch and gather under a band or clamp. Furthermore, given the nature of such liquid-tight seals, removal of the filter sock for any reason would involve more steps than would be required if the sock had a closed distal end.

Some prior art liquid filter socks have closed distal ends, one purpose being to reduce sealing problems. In some, the distal end of the sock is closed by a pre-installed rigid end cap, typically made of a common rigid plastic material. Such an end cap provides a downwardly-extending, downwardly-facing center socket which can facilitate placement of the sock support in the right location vis-a-vis adjacent sock supports, and an upwardly-extending center hub to assure proper placement of the filter sock on the sock support. As set forth in U.S. Pat. Nos. 5,456,834 and 5,580,456 (Bowlsbey), which disclose such liquid filter socks, the filter material of the sock is permanently bonded to a side wall of the end cap by a bonding process such as sonic welding. Such method of manufacture of a liquid filter sock is costly, and even then leaves the distal edge of the filter sock material exposed to the unfiltered liquid.

Other pertinent background information which is useful in understanding this invention is also included in the detailed descriptions section of this document.

OBJECTS OF THE INVENTION

It is an object of this invention, in the field of liquid filtration apparatus of the type having filter socks, to provide an improved liquid filtration apparatus overcoming some of the problems and shortcomings of the prior art.

Another object of this invention is to provide a liquid filter sock which has excellent qualities and provides excellent performance, but is less expensive than the present commercially-available liquid filter socks.

Another object is to provide an improved liquid filter sock which avoids any delamination problems.

Still another object of the invention is to provide an improved liquid filter sock which provides excellent flow-through and filtering properties together, yet provides good strength in difficult filter-sock environments.

Another object of this invention is to provide an improved liquid filter sock which readily releases captured particulates in back-pulsing operations.

Another object of this invention is to provide an improved liquid filter sock which can be contacted in handling without risk of any degradation.

Another object of this invention is to provide an improved liquid filter sock which is both inexpensive and yet efficient in operation and readily and easily reusable.

Another object of this invention is to provide an improved liquid filtration apparatus of the filter-sock type in which liquid-tight sealing problems are significantly reduced.

Still another object of this invention is to provide an improved liquid filter sock which, in addition to having excellent durability, filtering properties and flow-through, is very thin and thereby provides manufacturing advantages and economies.

These and other objects of the invention will be apparent from the following descriptions.

SUMMARY OF THE INVENTION

The invention is an improved liquid filter apparatus of the type including a liquid vessel, at least one (and typically many) elongate rigid perforate-tube sock support suspended within the vessel to receive therein filtrate liquid from unfiltered liquid in the vessel, and a filter sock over and along each of the sock supports. The filter apparatus is improved in that the filter sock is a non-perforated non-woven filter material of flash-spun plexifilamentary polyolefin fibrils, the filter material having a pressure drop of less than 4 psid at a flow rate of 10 gal/hr and a filtration efficiency of at least 98% of 1–2 micron particulates at a pressure differential of 30 psid.

In certain preferred embodiments the polyolefin of the material of such liquid filter sock is high-density polyethylene. The material of such filter sock exhibits a pressure drop of less than about 1.5 psid at a flow rate of 10 gal/hr and its filtration efficiency is at least about 99% of 1–2 micron particulates at a pressure differential of 30 psid. The material of the improved liquid filter sock has a mean flow pore size greater than 4 microns, in fact more preferably 5–7 microns, while its nominal pore-size filtration rating is 1 micron. Another preferred characteristic is that the liquid filter sock material has a Gurley Hill porosity rating no greater than about 5 sec/100 cc.

Each of the above-noted characteristics means that the material of the liquid filter sock has both excellent permeability (flow-through) and excellent filtering ability, a significant improvement in liquid filter socks. This is particularly beneficial and useful considering the additional fact that such filter sock is substantially less expensive than prior liquid filter socks and yet is highly durable in the filter-sock environment.

In highly preferred embodiments, the material of the liquid filter apparatus has a thickness of less than about 0.15 mm, most preferably about 0.13 mm. The material preferaby has a basis weight of less than about 45 g/m². Thus, excellent thinness is provided along with high durability which is beneficial for proper performance under significant pressure differentials such as are helpful in increasing filtering performance in a liquid filter sock. Furthermore, the thinness of the filter sock of this invention serves to significantly reduce and relieve proneness to leakage and contamination by enhancing the effectiveness of the pressure seal of such filter sock with the end of the filter-sock support. Given the thinness of the filter sock of this invention, any bunching and gathering have little or no negative effect on sealing.

In highly preferred embodiments, the aforesaid filter material of the liquid filter sock of this invention is itself free of laminations; it is a single layer, thus eliminating any concerns about delamination which exist for certain liquid filter socks of the prior art. The improved durability of such liquid filter sock makes this possible. In certain highly preferred embodiments, such single-layer filter material is the sole layer of the liquid filter sock, as made possible by the improved durability.

However, in some of the preferred embodiments of this invention, the filter sock includes a separate polyester scrim inner layer between the filter material and the sock support. Such scrim layer preferably has a thickness of less than about 0.30 mm, and with the filter material having a thickness of less than about 0.15 mm, the liquid filter sock has an overall thickness of less than about 0.45 mm. In the most preferred of such embodiments, the filter material is itself free of laminations. The scrim layer, with the extreme openness of scrims, serves as a drainage layer in that it opens up to liquid flow much of whatever limited portions of the filter material may otherwise be blocked by contact with the between-perforation areas of the sock support.

The thinness of the liquid filter sock of this invention, whether with or without the aforesaid scrim layer, has the added advantages of facilitating the provision of an improved closed filter-sock distal end, as described below.

The liquid filter material used in manufacture of the liquid filter sock of this invention is a form of Tyvek® known as SoloFlo® available from DuPont, and formed into a cylindrical sock. The distal end portion of such liquid filter sock may be closed in sealing fashion in various ways, or may be sealingly secured to the distal end of the elongate sock support on which it is used.

A closed-end liquid filter sock can include a two-member end cap of particular structure which sealingly closes the distal end of the thin filter sock (i.e., of the material forming the length of the sock) by engagement of the end cap with the distal end portion of the filter sock. The distal end of the sock, of course, is the end which is typically always submerged in unfiltered liquid, at least during filtering operations. More specifically, the end cap includes separate first and second rigid engageable members which are configured for engagement with each other with the distal portion of the filter sock therebetween, to sealingly close the distal end by an interference fit. The first and second members of the end cap are concentrically engageable to provide an annular seal. It is most preferred that the first member be a cup and the second member be an insert which is inserted into the cup to create the aforementioned interference fit, which sealingly squeezes the annular distal end portion of the liquid filter sock to form an annular seal.

The cup is within the filter sock and has a closed (imperforate) endwall and an annular sidewall which is parallel to the axis of the sock. The annular sidewall has inside and outside surfaces and extends from the endwall in an axially-parallel distal direction to form a recess. The outside surface of the sidewall engages the inside of the filter sock and has a cross-dimension (e.g., a diameter of the filter sock is in the preferred cylindrical shape) approximating the cross-dimension of the sock. The distal portion of the filter sock is turned back and inwardly into the recess and terminates within the recess. The insert, which is thereafter inserted into the recess formed within the cup, has a periphery (preferably a circular periphery) which has a cross-dimension (e.g., diameter) slightly less than the cross-dimension of the recess such that the distal portion of the sock is sealingly sandwiched between the periphery of the insert and the inside surface of the sidewall of the cup. The insert is preferably in the form of a disk.

This improved closed-end liquid filter sock is simply, reliably and inexpensively assembled, without the need for any adhesive bonding or any other bonding process such as sonic welding. This provides enhanced, highly reliable seal of liquid filter sock distal ends and eliminates any need for distal-end sealing of the filter sock to the lower end of the filter-sock support. Furthermore, it completely isolates the distal edge of the filter sock from any contact with unfiltered liquid, and thus enhances the sealing qualities.

The non-perforated, non-woven flash-spun polyolefin filter material of the liquid filter socks of this invention provides an outside filter-sock surface which is fairly smooth and capable of readily releasing particulates captured thereon. That is, particulates captured during filtering operations are readily released in back-pulsing operations. This, in addition to the fact that the liquid filter socks of this invention are durable in back-pulsing, enhances reusability of such filter socks, thereby extending the useful life of such filter socks.

The nature of the polyolefin filter material of the filter socks of this invention allows such filter socks to be contacted in handling without any risk of degradation.

Many physical characteristics, performance parameters and technical terms have been used above in this summary. The characteristics and parameters are in most cases determined in accordance with accepted tests; ASTM tests are referred to later in this document. Furthermore, definitions of various terms are provided for enhanced clarity of this document.

BRIEF DESCRIPTION OF THE DRAWINGS

FIG. 1 is a schematic perspective view of a liquid filtration apparatus in accordance with this invention, including breakaway portions to better illustrate parts.

FIG. 2 is an enlarged (compared to FIG. 1) partially-broken-away fragmentary perspective view of one of the sock support tubes and its corresponding liquid filter sock of FIG. 1.

FIG. 3 is a further enlarged fragmentary view of FIG. 2, as indicated in FIG. 2, with breakaway portions.

FIG. 4 is a further enlarged exploded perspective view of FIG. 3, but showing only details of the two-part end cap and the distal end portion of the liquid filter sock which is engaged and sealed by such end cap.

DETAILED DESCRIPTION OF PREFERRED EMBODIMENTS

Figure 5:
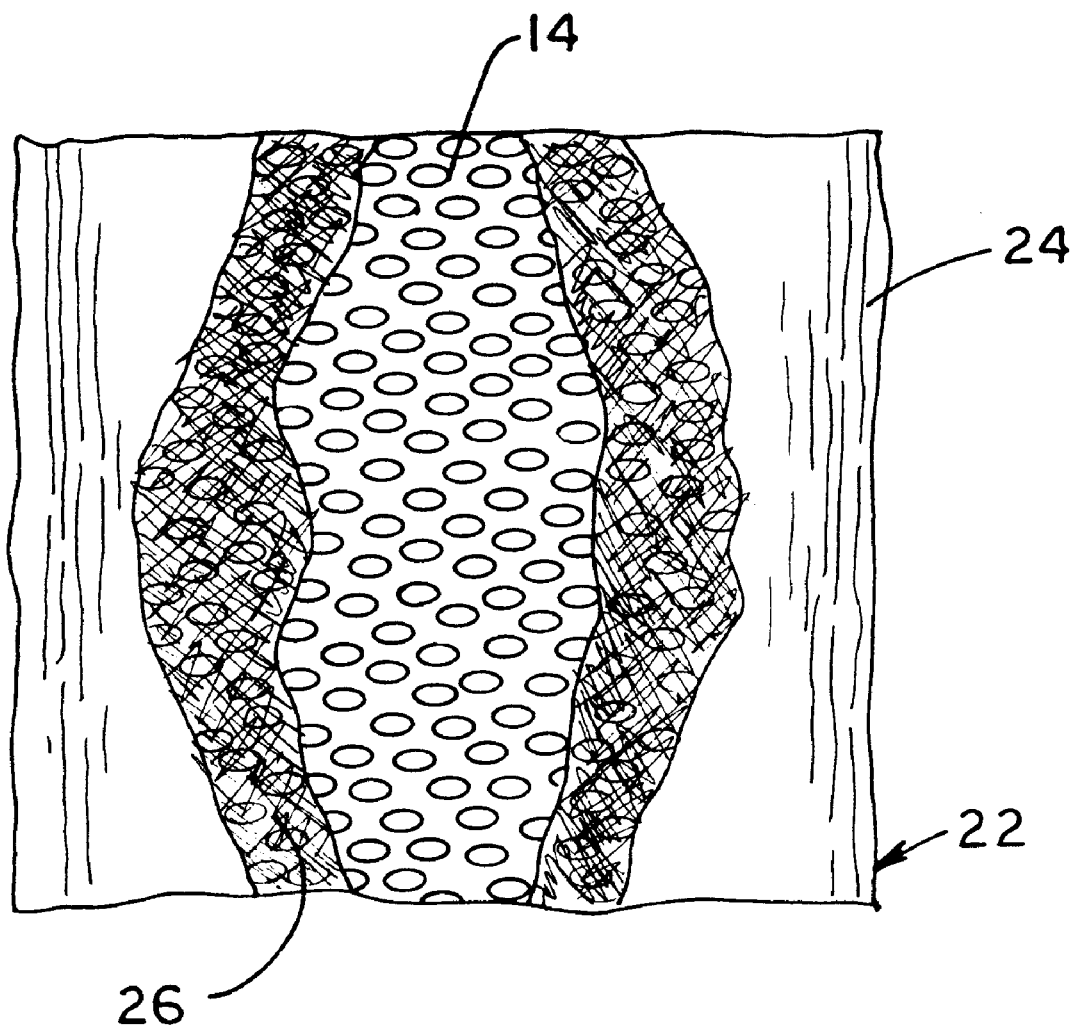
FIG. 5 is a further enlarged fragmentary view of a sock support tube and its corresponding liquid filter sock, but showing another embodiment of the invention—in which the sock also includes a separate inner scrim layer.

FIG. 1 illustrates a liquid filtration apparatus 10 of the filter-sock type in accordance with this invention. Filtration apparatus 10 includes a liquid vessel 12, a plurality of elongate rigid sock supports 14 sock supports suspended within vessel 12 in position to receive therein filtrate liquid from unfiltered liquid 16 in the vessel, and an improved liquid filter sock 18 over and along each of sock supports 14. Filter sock 18 will be described in detail below.

As in many liquid filter apparatus of the filter-sock type, liquid vessel 12 has a liquid inflow and outflow conduits 12a and 12b, and contains unfiltered liquid 16 to a depth such that most of the lengths of filter socks 18 are submerged. Each sock support 14 is tubular and is covered with perforations to allow the inflow of filtrate liquid which passes through liquid filter socks 18. Sock supports 14 are closed at their lower ends and open at their upper ends, their upper-end openings providing outflow to a manifold (not shown) which leads to outflow conduit 12b. The pressure in liquid vessel 12 is significantly higher than the downstream pressure inside sock supports 14 and along the outflow passageways including outflow conduit 12b. This, of course, allows the functioning of the liquid filter apparatus. Sock supports 14 and filter socks 18 are held in appropriate parallel spaced positions within liquid vessel 12. The tops of sock supports 14 are positioned by their fluid-flow connections, while the bottoms are positioned by receiving spaced studs extending upwardly from a spacer member 13 on the floor of liquid vessel 12.

Preferred liquid filter sock 18 is manufactured using (alone or with a suitable scrim layer) a non-perforated non-woven filter material 20 about 0.13 mm thick of flash-spun plexifilamentary polyethylene fibrils such that the material has a pressure drop of less than 1.5 psid at a flow rate of 10 gal/hr and a filtration efficiency of at least 99% of 1–2 micron particulates at a pressure differential of 30 psid. Such preferred filter material 20 has a mean flow pore size greater than 4 microns, while its nominal pore-size filtration rating is 1 micron, and a Gurley Hill porosity rating no greater than about 5 sec/100 cc. The material is corona-treated during manufacture for improved hydrophillicity.

Filter material 20 of liquid filter sock 18 of this invention may be made using Tyvek® SoloFlo® from DuPont. Such preferred material and the process for material manufacture are described in detail as part of the disclosure of PCT Patent Publication WO98/07905 of DuPont, of Wilmington, Del. Acceptable materials include those referred to in Examples 29–32 of such document, and among these the materials of Examples 30–31 are preferred with the material of Example 31 being more preferred. The filter material of such document has been used commercially in flat liquid filter forms and functions; however, the present invention involves its use in liquid filter socks and in liquid filtration apparatus of the filter-sock type, in which significant and heretofore unexpected advantages are provided.

Manufacture of liquid filter sock 18 using such material can be carried out using one or more sheets of such material by joining overlapping edge portions to form a cylindrical sock body, open at opposite ends—one of which is thereafter be closed, as described below in more detail. The joining of overlapping edge portions is carried out using known bonding methods, such as the method disclosed in U.S. Pat. No. 3,945,873 (Osborn et al.) for manufacture of irrigation tubing or appropriate ultrasonic bonding techniques. Appropriate bonding to form the filter material cylinders is available from International Irrigation Systems Inc. of Niagara Falls, N.Y. It is very important, of course, that the bonding method which is used not form weaknesses or perforations damaging the integrity of the liquid filter socks.

A description of various physical characteristics, performance parameters and technical terms used herein will be useful in understanding the characteristics of the preferred embodiments of this invention. In some cases, reference is made to standard ASTM tests and other tests.

"Permeability" of a filter material is a function of the differential pressure, the porosity and the area of the filter material. One measure of "permeability" is the "pressure drop" necessary to drive 10 gal/hr through a sample of the filter material 90 mm in diameter. This, of course, is expressed in pounds per square inch difference in pressure (psid).

The term "filtration efficiency" is measured using a procedure based on ASTM 795-82. Such test determines what percentage of particles in a particular size range in a stream of distilled water are retained by a filter material; it may be run using particles in the range of 0.5–150 microns. For example, under this method, a concentrated suspension of fine test dust is injected into water upstream of the filter material and the number of upsteam particles in the size range of 1–2 microns is measured; after water flow through the filter material at a predetermined pressure differential occurs, the number of such 1–2 micron particles downstream of the filter material is measured. The filtration efficiency is percentage of such upstream particles which were not found downstream.

The term "mean flow pore size" refers to a measure of the filter pore size at which half of the total airflow through the sample occurs through pores larger than the mean, and half of the airflow occurs through pores smaller than the mean. It is measured using a Coulter-II porometer.

The term "Gurley Hill porosity" refers to a measure of the permeability of the sheet material for gaseous materials. It measures how long it takes a volume of gas (100 cc of air) to pass through a given area (a sample one inch in diameter) of the filter material when there is a predetermined pressure gradient across the material (4.9 inches of water). It is measured in accordance with TAPPI T-460 om-88 using a Lorentzen & Wettre Model 121D densometer. The result is given in seconds/100 cc.

The term "basis weight" refers to the weight of the filter material. It is given in $g/m^2$ and is determined by ASTM D-3776.

The term "plexifilamentary" as used herein, means a three-dimensional integral network of a multitude of thin, ribbon-like, film-fibril elements of random length and with a mean film thickness of less than about 4 microns and a median fibril width of less than about 25 microns. In plexifilamentary structures, the film-fibril elements are generally coextensively aligned with the longitudinal axis of the structure and they intermittently unite and separate at irregular intervals in various places throughout the length, width and thickness of the structure to form a continuous three-dimensional network.

The term "lamination," as used herein, refers to a material having layers bonded to one another surface-to-surface.

FIG. 5 shows another liquid filter sock 22 which is another embodiment of this invention. The filter material 24 of filter sock 22 in FIG. 5 is identical to the filter material 20 of liquid filter sock 18, shown in FIGS. 1–4; both are free of laminations and very thin (0.13 mm). One significant advantage of such filter material of the liquid filter socks of this invention is that it does not require a support substrate of any kind. It functions well through plural cleanings and usages without any support substrate.

The filter material 20 and 24 of the illustrated liquid filter socks (18 and 22) of this invention, as already noted, has significant strength attributes. It is exceptionally strong, can operate with significant pressure differentials, and resists damage. It is also dimensionally stable even at fairly high liquid temperatures.

Filter sock 22 of FIG. 5 differs from filter sock 18 of FIGS. 1–4 in that filter sock 22 has, in addition to its filter material 24, an inner polyester scrim layer 26 which is separate from filter material 24—separate in the sense that they do not together form a lamination. Scrim layer 26, which is under 0.30 mm in thickness, serves as a drainage layer as indicated above. The combined thickness of filter material 24 and scrim layer 26 is under 0.45 mm.

FIGS. 3 and 4 serve to illustrate the submerged closed end of liquid filter sock 18, an end closed by a rigid end cap—one form of a closed end. (The alternative to the filter sock itself being closed—i.e., closed prior to engagement about the sock support—is for the filter sock to be in annular sealing engagement with the lower end of the sock support.) As shown in FIG. 4, filter sock 18 has an annular distal end portion 30 which terminates in an annular distal edge 32. A two-member end cap 34 is used to sealingly close the distal end of filter sock 18, as now explained.

End cap 34 includes a rigid plastic cup 36 and a rigid plastic insert 38, concentric members which are configured for engagement with each other with distal end portion 30 of filter sock 18 between them, to sealingly close the distal end of filter sock 18 by means of an interference fit. Cup 36 has a closed (imperforate) endwall 36a which is generally perpendicular to the axis of sock support 14 and filter sock 18 and an annular sidewall 36b which is concentric with and parallel to the axis of sock 18. Annular sidewall 36b has inside and outside surfaces 36c and 36d and extends from endwall 36a in an axially-parallel distal direction to form a recess 36e of generally circular shape.

Outside surface 36d of sidewall 36b engages the inside of filter sock 18 as cup 36 is placed within filter sock 18 near distal end portion 30 thereof. Cup 36 (and thus outside surface 36d of sidewall 36b) has a diameter approximating (i.e., just slightly less than or about equal to) the inside diameter of filter sock 18. Distal end portion 30 of filter sock 18 is turned back and inwardly into recess such that distal edge 32 terminates within circular recess 36e. Insert 38, in the form of a circular disk, is then inserted into recess 36e to form the aforementioned interference fit by which the distal end of filter sock 18 is sealingly closed.

More specifically, insert disk 38 has a circular periphery 38a which has a diameter slightly less than diameter of recess 36e. The dimensioning is chosen such that distal end portion 30 of filter sock 18 is sealingly sandwiched between periphery 38a of insert disk 38 and inside surface 36c of sidewall 36b of cup 36. FIG. 3 illustrates such sandwiching and interference fit.

FIGS. 3 and 4 also show that endwall 36a of cup 36 has a hub 36f which projects axially from both inside surface 36c and outside surface 36d of endwall 36a—in an upwardly-projecting hub portion 36g and a downwardly-projecting hub portion 36h, respectively. These axially-projection portions of hub 36f serve engaging and locating functions which are known in the art.

Upwardly-projecting hub portion 36g serves to engage a female receptor (unnumbered, but illustrated in FIG. 3) on the bottom end of sock support 14. Downwardly-projecting hub portion 36h serves a locating and positioning function for sock support 14 and filter sock 18 by providing another female receptor 36i which receives an upward stud (not shown in FIG. 3) extending from spacer member 13 (seen in FIG. 1) at or near the bottom of liquid vessel 12.

Insert disk 38 has a center hole dimensioned to allow insert disk 38 to be received over downwardly-projecting hub portion 36h as insert disk 38 is inserted into recess 36e. This serves to facilitate the proper engagement of insert 38 with cup 36, which in turn serves to facilitate quick and easy manufacture of filter sock 18, with its closed and sealed distal end. As already noted, no sonic welding or other complex bonding steps are required.

The filter sock of this invention, used in a form open at both ends rather than in a form with an end cap or other closed distal end, provides particularly good seals between the filter sock and the lateral walls at the opposite ends of the sock support. Such seals, including the lower submerged seal or the upper seal (which may be submerged on non-submerged in unfiltered liquid), are provided by banding and/or clamping devices known in the art, which provide radial pressure. As indicated above, the thinness of the sock material allows excellent and reliable seals using such known pressure-applying sealing devices.

A great number of modifications and variations are possible within the scope of this invention. While the principles of this invention have been described in connection with specific embodiments, it should be understood clearly that these descriptions are made only by way of example and are not intended to limit the scope of the invention.

What is claimed is:

1. Liquid filter apparatus for removing particulates from a liquid, the filter apparatus including a liquid vessel, at least one elongate rigid sock support suspended within the vessel to receive therein filtrate liquid from unfiltered liquid in the vessel, the sock support(s) having inflow perforations along the length thereof and an outflow opening at an end thereof, and a filter sock over and along each of the sock supports and susceptible to repeated non-supported back-washing, characterized in that the filter sock is a non-perforated non-woven filter material of flash-spun plexifilamentary polyolefin fibrils, the filter material having a thickness of less than about 0.15 mm and having a pressure drop of less than 4 psid at a flow rate of 10 gal/hr and a filtration efficiency of at least 98% of 1–2 micron particulates at a pressure differential of 30 psid.

2. The liquid filter apparatus of claim 1 wherein the polyolefin is high-density polyethylene.

3. The liquid filter apparatus of claim 2 wherein the filter material has a pressure drop of less than about 1.5 psid at a flow rate of 10 gal/hr and the filtration efficiency is at least about 99% of 1–2 micron particulates at a pressure differential of 30 psid.

4. The liquid filter apparatus of claim 3 wherein the mean flow pore size of the filter material is greater than 4 microns while its nominal pore-size filtration rating is 1 micron.

5. The liquid filter apparatus of claim 3 wherein the filter material has a Gurley Hill porosity rating no greater than about 5 sec/100 cc.

6. The liquid filter apparatus of claim 1 wherein the filter material has a basis weight of less than about 45 g/m$^2$.

7. The liquid filter apparatus of claim 1 wherein the filter material is itself free of laminations.

8. The liquid filter apparatus of claim 7 wherein the filter material is the sole layer of the sock.

9. The liquid filter apparatus of claim 1 wherein the filter sock includes a separate polyester scrim inner layer between the filter material and the sock support, the scrim layer having a thickness of less than about 0.30 mm.

10. The liquid filter apparatus of claim 9 wherein the filter material has a thickness of less than about 0.15 mm such that the filter sock has an overall thickness of less than about 0.45 mm.

11. The liquid filter apparatus of claim 10 wherein the filter material is itself free of laminations.

12. Liquid filter apparatus for removing particulates from a liquid, the filter apparatus including an elongate substantially rigid hollow support having an annular wall, the support having inflow perforations along the length thereof and an outflow opening at an end thereof, and a tubular filter along the support and over the annular perforate wall and susceptible to repeated non-supported back-washing, characterized in that the tubular filter is a non-perforated non-woven filter material of flash-spun plexifilamentary high-density polyethylene fibrils, the filter material having a thickness of less than about 0.15 mm and having a pressure drop of less than 1.5 psid at a flow rate of 10 gal/hr and a filtration efficiency of at least 99% of 1–2 micron particulates at a pressure differential of 30 psid.

13. The liquid filter apparatus of claim 12 wherein the mean flow pore size of the filter material is greater than 4 microns while its nominal pore-size filtration rating is 1 micron.

14. The liquid filter apparatus of claim 12 wherein the filter material has a Gurley Hill porosity rating no greater than about 5 sec/100 cc.

15. The liquid filter apparatus of claim 12 wherein the filter material has a basis weight of less than about 45 g/m$^2$.

16. The liquid filter apparatus of claim 12 wherein the filter material is itself free of laminations.

17. The liquid filter apparatus of claim 16 wherein the filter material is the sole layer of the sock.

* * * * *